United States Patent [19]

Mayer

[11] 4,442,486

[45] Apr. 10, 1984

[54] PROTECTED PROGRAMMABLE APPARATUS

[75] Inventor: Robert T. Mayer, Rye, N.Y.

[73] Assignee: U.S. Philips Corporation, New York, N.Y.

[21] Appl. No.: 324,744

[22] Filed: Nov. 25, 1981

[51] Int. Cl.³ .................... G06F 3/14; G06F 13/00
[52] U.S. Cl. ................................................ 364/200
[58] Field of Search .............. 178/22.01, 22.12, 22.13, 178/22.14, 22.18; 364/200 MS File, 900 MS File

[56] References Cited

U.S. PATENT DOCUMENTS

| | | | |
|---|---|---|---|
| 3,806,882 | 4/1974 | Clarke | 364/200 |
| 4,118,789 | 10/1978 | Casto et al. | 364/900 |
| 4,120,030 | 10/1978 | Johnstone | 364/200 |
| 4,141,078 | 2/1979 | Bridges, Jr. et al. | 364/900 |
| 4,168,396 | 9/1979 | Best | 364/900 |
| 4,183,085 | 1/1980 | Roberts et al. | 364/200 |
| 4,225,779 | 9/1980 | Sano et al. | 235/379 |
| 4,350,844 | 9/1982 | Stürzinger et al. | 178/22.18 |

FOREIGN PATENT DOCUMENTS 2923738 6/1979 Fed. Rep. of Germany ...... 364/200

OTHER PUBLICATIONS

IBM Technical Disclosure Bulletin, vol. 14, No. 11, p. 3531, Apr. 1972.

*Primary Examiner*—Jerry Smith
*Assistant Examiner*—Mark P. Watson
*Attorney, Agent, or Firm*—Robert T. Mayer

[57] ABSTRACT

Apparatus that discourages the use of computer equipment with software that is not approved for such use by the manufacturer of the computer equipment. This apparatus requires software to generate display producing signals but to produce them for a short enough period of time to be imperceptible. The display may be the identification of a patent or patent application.

13 Claims, 3 Drawing Figures

PROTECTED PROGRAMMABLE APPARATUS

The invention relates to methods and apparatus which discourage and/or prevent the use of unauthorized program material with proprietary computer hardware.

This application is related to U.S. patent application Ser. No. 324,743, of Jack E. Haken, Charles B. Heffron and Roberto Lenarduzzi, entitled "Method and Apparatus to Secure Proprietary Operation of Computer Equipment" filed concurrently herewith and assigned to the assignee of this application.

BACKGROUND OF THE INVENTION

In many instances the manufacturer and/or proprietor of digital computer hardware may find it necessary or advantageous to exercise control over the nature, origin and/or quality of computer programs, data, or other software which is utilized with the hardware or, in some cases, to totally preclude the operation of certain software with the hardware.

The need to control software operation is particularly critical when the computer hardware is utilized to monitor or control the operation of moving or radiating equipment or other potentially dangerous instrumentalities where the uncontrolled use of software developed by a user or third party may expose the equipment manufacturer to liability claims. In many cases government or other certifications of equipment, for example, of computerized medical equipment, are conditioned on the use of that equipment with particular software. A manufacturer's desire to control software use may also be based on commercial considerations. For example, a manufacturer may sell hardware at a small profit with the expectation of recouping profits from the sale of software.

The computer industry has, for some time, utilized various protection code and password techniques to prevent unauthorized users from acccessing and/or controlling programs and data at a particular hardware installation or for limiting the use of proprietary software to a particular installation. Those techniques generally require that a unique identification number be associated with each user and/or hardware installation. Their integrity also generally requires that the security of at least a portion of the system software or firmware (which contains and/or checks the password or identification number) be maintained. These prior art techniques are not, therefore, directly adoptable to preclude the use of unauthorized software on hardware systems which move outside of the proprietor's physical control and are thus subject to reverse engineering as, for example: video game consoles which are distributed to the consumer market.

SUMMARY OF THE INVENTION

The present invention provides methods and apparatus for preventing the wrongful use of separable software with electronic digital computer apparatus. In accordance with the methods of the invention the computer apparatus is operated to sense the presence of information at one or more predetermined addressable locations in the separable software and to produce, in response thereto, an audible and/or visual display which is uniquely derived from that information. The content of the display, or signals uniquely related thereto, are then compared with reference information which is recorded in hardware or firmware of the computer apparatus to determine if the display is congruent with the recorded reference information. Some or all further operation of the computer is inhibited if congruence is not detected.

In a preferred embodiment of the invention the recorded reference information represents a display which is lawfully usable only by the proprietor of the digital computer apparatus, for example by virtue of the protection afforded him by the patent, copyright, or trademark statutes or by virtue of the law of unfair competition.

DESCRIPTION OF THE DRAWINGS

The invention may be understood with reference to the attached drawings in which.

DESCRIPTION OF THE PREFERRED EMBODIMENTS

Figure 1:
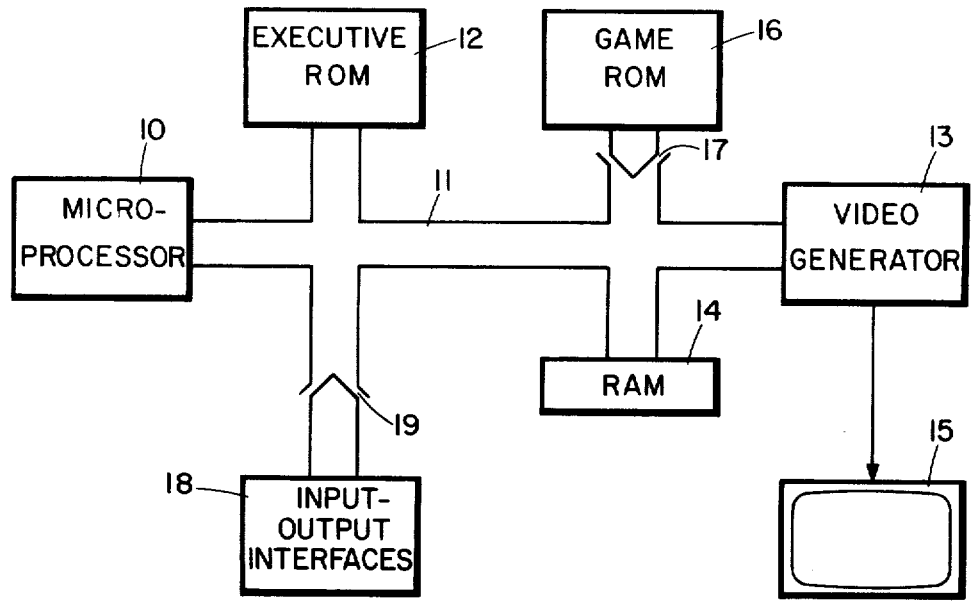
FIG. 1 is a block diagram showing the architecture of a programmable video game.

FIG. 1 schematically represents the architecture of a bus oriented, programmable video game. The architecture of FIG. 1 is also analogous, for example, to the architecture of programmable medical diagnostic apparatus (for example ultrasound or CT scanners) and of some computer controlled machinery. A microprocessor 10 communicates data, instructions, and address information via a bus 11 with a read-only memory (the EXECUTIVE ROM) 12 which contains EXECUTIVE program software, a video generator 13, a random access memory (RAM) 14, a read-only memory 16 (the GAME ROM) containing software for a particular game, and, optionally, with various input-output interfaces 18 which communicate data to one or more accessories, for example a printer or a tape recorder. The microprocessor 10, EXECUTIVE ROM 12, video generator 13 and RAM 14, typically, are all contained within a single hardware console unit. The GAME ROM 16 and interfaces 18 are external to and separable from the console and connect to the bus 11 via removable connectors 17 and 19.

The microprocessor 10 generally comprises an integrated circuit processor which is capable of addressing and executing program instructions which are stored in ROM's 12 and 16 or in RAM 14, of reading data resident in ROM's 12 and 16, and RAM 14, at I/O interfaces 18 or in data registers of the video generator 13. The microprocessor is also capable of writing data to addresses in RAM 14, registers in video generator 13, and to I/O interface 18.

Video generator 13 may be one or more dedicated integrated circuits which produce a raster scan television signal in response to image data received via bus 11 from microprocessor 10 and/or one or more of memories 12, 14 and 16. The video generator may typically include a character generator for producing alphanumeric characters in a video image in response to ASCII coded character information and position addresses received from the data bus and may, additionally, contain circuitry for generating object oriented displays and/or for mapping information contained in the random access memory 14 to points in the video image. The raster scan television signal produced by video generator 13 is fed to and displayed on cathode ray tube 15 which may be contained in the video game console or may be a separate television monitor or receiver. The video generator may also be capable of generating audible signals which are produced either through television receiver 15 or through a separate loudspeaker in the game console.

Figure 2:
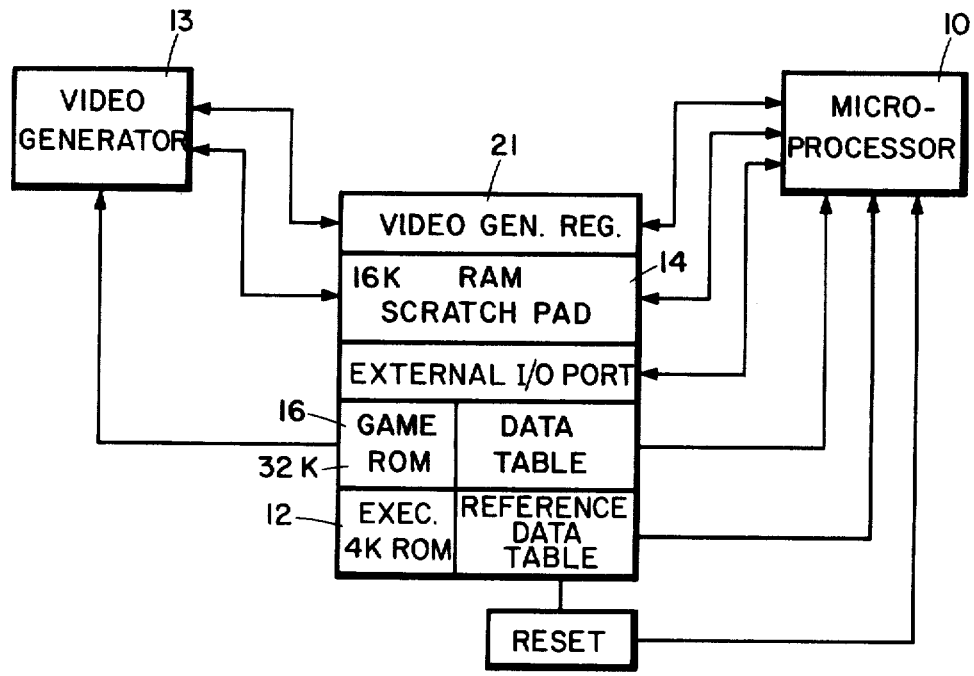
FIG. 2 is a memory map of the video game of FIG. 1.

Microprocessor 10 communicates with the memories 12, 14 and 16, and the registers of video generator 13 by transmitting discrete address information, identified with those components, over bus 11. The "address space" of a preferred embodiment of the video game is illustrated in FIG. 2. A group of, for example, 4K addressable locations comprise data stored in the EXECUTIVE read only memory. The EXECUTIVE read-only memory contains data and program routines which are utilized by all or many of the separable game programs which operate with the console unit. These may, for example, comprise programs for initializing the console at the start of each game or for generating standard displays.

The address space further includes for example approximately 32K addresses assigned to the separable GAME ROM 16 which contains program routines and data which are uniquely associated with one or more particular video games and which function to generate the displays, score keeping, and logic function of those games.

The address space further includes for example approximately 16K of random access memory 14 which may alternately be utilized for storage of a video display in any format (for example as a direct bit map or in a coded character or object oriented format) or for scratch-pad data storage.

A relatively small number of locations of the address space are associated with registers and control functions in the video generator and are utilized by the microprocessor to control the mode and operation of the generator and to determine the status of the display.

As indicated in FIG. 2 the video generator 13 is capable of reading information from the GAME ROM and of reading and/or writing information to and from the RAM 14 as well as to and from its own registers 21. The microprocessor 10 can read and write information to and from the video generator registers, the RAM 14, and the external I/O port and can read information from the GAME and EXECUTIVE ROM's. Hardware circuitry associated with the microprocessor 10 automatically reads a first program instruction from address 0 of the EXECUTIVE ROM whenever the console is RESET. A RESET typically occurs whenever power is applied to the console when a "RESET" key is depressed, and whenever a new GAME ROM 16 is inserted in connector 17.

Figure 3:
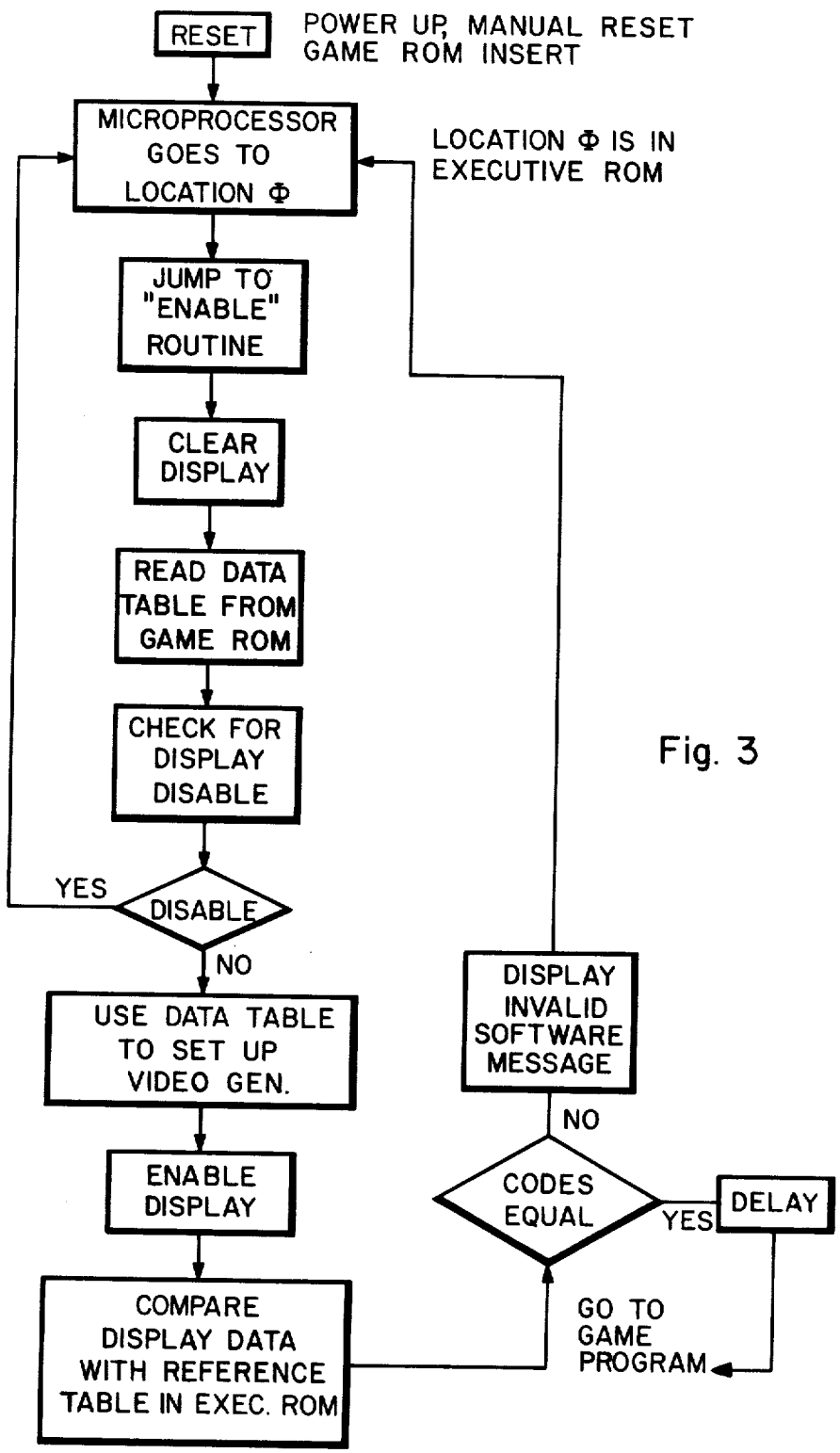
FIG. 3 is a flow chart of a software implementation of the invention in the video game of FIGS. 1 and 2.

FIG. 3 is a flow chart of an initialization routine which implements the present invention in the video game console of FIG. 1. Except as indicated in the following text, the initialization routine is implemented as firmware instructions installed in the EXECUTIVE ROM 12 and is thus contained, in unalterable form, as a physical part of the video game control console hardware. A RESET (whether produced by power on, the insertion of a ROM cartridge in connector 17, or by a manual reset key), causes the microprocessor hardware to execute the instruction at location 0 in the EXECUTIVE read-only memory 12. Location 0 contains an instruction which causes program execution to jump to an ENABLE routine which is stored at a previously determined location in the EXECUTIVE ROM. The ENABLE routine first issues a command to the video generator 13 which causes the video generator to clear the video display to a blank screen and then proceeds to read information from a DATA TABLE which is contained at predetermined addresses in the GAME ROM, and to write corresponding information into the video display control area of the RAM.

The video generator 13 may, possibly, include hardware which disables the operation of the audio and/or video display upon receipt of a given command or sequence of commands. After loading the data from the GAME ROM into the RAM the ENABLE routine checks the loaded data to determine whether or not it contains instructions which, if supplied to the video generator, would disable the generator operation. If such instructions are present in the RAM the program loops back to location 0 and will continue to execute an endless loop of the previously described program instructions until the GAME ROM is removed. During execution of the loop, the video display will remain blank and the console will be incapable of executing any program code contained in the GAME ROM. Alternately, the display may be made to present the text "INVALID SOFTWARE" or a similar appropriate message.

If the ENABLE routine determines that the DATA TABLE does not contain a code which would disable the video generator, it then utilizes the data contained in the DATA TABLE as a display input to the video generator 13. The microprocessor issues a command to the video generator 13 to display the stored inputted data on the display 15. After the video generator has been enabled and while the image is being displayed the microprocessor compares the data stored in the RAM 14 and/or the contents of DATA TABLE in GAME ROM 16 with a field of reference data which is recorded at locations in the EXECUTIVE ROM 12. If the comparison indicates that the data stored for input to the video display is different from that stored in the reference table of the EXECUTIVE ROM, the microprocessor loops back to location 0 and continues to execute an endless loop until the GAME ROM is removed. The loop will alternately clear the screen and present the display defined by the DATA TABLE in the GAME ROM; but no execution of programs or other display fields contained in the data stored in the GAME ROM will be permitted.

If the microprocessor determines that the data field stored in the RAM is congruent with the reference field stored in the EXECUTIVE ROM the microprocessor then branches to execute a video game or other program contained in the GAME ROM. In accordance with the invention congruence occurs if the data field is a prescribed display instruction.

It is a feature of the invention that the display which is produced by the video generator 13 in response to the DATA TABLE stored in the RAM be a display which can only legally be used by or with the permission of the manufacturer or proprietor of the console. For example, the display may comprise audio or visual material which is copyrighted by the console proprietor; may contain one or more registered trademarks or other industrial or commercial property rights of the proprietor or may present text which unequivocally indicates that the program material originated from, was manufactured by or was produced under license of or with the permission of the proprietor. If the equipment is protected by a patent or is the subject of a patent application the text may also unequivocally state that fact.

A preferred embodiment of apparatus which is the subject of a U.S. patent application could also include as part of the particular display a phrase indicating that the apparatus practices the invention of that application and/or corresponding foreign applications and/or patents granted thereon or some other similar identifying phrase. For example, such language could include a phrase similar to "This apparatus uses the invention of U.S. patent application entitled Protected Programmable Apparatus filed on Nov. 25, 1981 and assigned to U.S. Philips Corporation and any patent issuing thereon." This phrase, of course, would also include the filing data of that application, which of course, is the filing date of the present application. Alternatively, the phrase could read "This apparatus practices the invention of U.S. patent application Ser. No. 324,744" which would include the serial number of the application identified two sentences above. This latter phrase could include the language "the invention of the claims etc.". The phrase could also include reference to corresponding foreign applications and patents. Under some conditions it might be found objectionable to display these types of phrases. If it should be so found the program material can be arranged so that the signals which produce these phrases are short lived enough to produce a display which is imperceptible to a normal viewer. Nevertheless, the phrase or phrases could be viewed if the display were, for example, filmed by a slow motion camera. Such displays by non-licensed equipment may constitute an admission of infringement.

In one of the embodiments in which the subject matter disclosed herein can be used, namely a programmable TV game the program material including its instructions and the code or prescribed display instruction that will produce the particular desired display would be contained in a ROM mounted in a cassette like cartridge which is made to be plugged into an electrical connector in a console containing the computer equipment which the ROM operates with.

The information contained in the DATA TABLE which is stored in the GAME ROM and read by the ENABLE routine may be an actual bit pattern memory map of the image to be presented on the display 15. Alternately, the information in the program ROM DATA TABLE may be a code which enables a character generator in the video generator 13 to present a display or it may be a predetermined set of characters which are recognized by the microprocessor as an instruction which has no function other than to cause the set-up of the RAM for example by using data stored in the EXECUTIVE ROM to present the indicated display. Likewise, the comparison made between the DATA TABLE and the reference data stored in the EXECUTIVE ROM need not indicate equivalence but merely congruence between the data. As used herein, the term "congruence" means that the data, when processed by the video generator 13, will produce a display having the same recognizable and distinguishing features which can only be used by or with the permission of the console owner.

In a preferred embodiment of the invention the display is cleared before the image controlled by the data in the DATA TABLE is presented. In this way, it is assured that the display does not contain any text, in addition to the commanded display, which might alter its meaning or interpretation.

The invention is not restricted to hardware which determines that a predetermined data field is visually displayed at the start of program operation. Thus, in alternate embodiments, the EXECUTIVE ROM routine may contain program code which assures that some or all of the display produced by the Data Table is continuously shown during operation of the program contained in the GAME ROM.

Although the preferred embodiment of the invention has been described as a software program which operates in conjunction with a video game hardware console, those skilled in the art will recognize that some or all of the functions described in software terms could alternately be implemented by hardware circuits and that the circuitry described herein is operable in other computer controlled apparatus, for example medical imaging or machine control apparatus. Likewise the source of program which is separable from the console need not be a read-only memory but might, alternately, be any other known program source which is separable from the console, for example magnetic tape or disc memory or a modem which receives data from a remote location over a communication circuit.

What I claim is:

1. Improved apparatus including computer equipment; program material including a plurality of instructions, part of which is a prescribed display instruction; said computer equipment being removably connectable to said program material; said computer equipment when connected to said program material operating to produce signals in accordance with said instructions; a display device responsive to said signals and producing displays in accordance therewith; said prescribed display instruction causing said computer equipment to produce signals which if received by said display device would cause it to produce a particular display; said computer equipment including means preventing said equipment from operating with program material not containing said prescribed display instruction, and wherein the improvement comprises a prescribed display instruction which produces a particular display including the phrase "This apparatus uses the invention of U.S. patent application entitled Protected Programmable Apparatus filed on Nov. 25, 1981 and any patent issuing thereon."

2. Improved apparatus according to claim 1 wherein said particular display includes the phrase "This apparatus uses the invention of U.S. patent application Ser. No. 324,744".

3. Improved apparatus according to claim 1, wherein said particular display includes the phrase "This apparatus uses the subject matter of the claims of U.S. patent application Ser. No. 324,744".

4. Improved apparatus according to claim 3, wherein said prescribed display instruction causes said display device to display said particular display for a period of time which is short enough to render said display imperceptible to a normal viewer.

5. Improved apparatus including computer equipment; program material including a plurality of instructions, part of which is a prescribed display instruction; said computer equipment being removably connectable to said program material; said computer equipment when connected to said program material operating to produce signals in accordance with said instructions; a display device responsive to said signals and producing displays in accordance therewith; said prescribed display instruction causing said computer equipment to produce signals which if received by said display device would cause it to produce a particular display; said computer equipment including means preventing said equipment from operating with program material not containing said prescribed display instruction, and wherein the improvement comprises a prescribed display instruction which produces a particular display identifying a U.S. patent application which the apparatus practices the invention of and, if desired, foreign counterparts thereof and/or, if desired, any patents issuing thereon.

6. Programming means for use with apparatus including computer equipment and a display; said programming means including a plurality of instructions, part of which is a prescribed display instruction; said programming means being removably connectable to said computer equipment; said computer equipment when connected to receive said instructions operating to produce signals in accordance therewith; said display device being responsive to said signals and producing displays; said prescribed display instruction causing said computer equipment to produce signals which if received by said display device would cause it to produce a particular display; said computer equipment including means preventing said equipment from operating with programming means not containing said prescribed display instruction; and wherein the improvement comprises a prescribed display instruction which produces a particularly display identifying a U.S. patent application which the apparatus uses the invention of and, if desired, foreign counterparts thereof and/or, if desired, any patents issuing thereon.

7. Programming means according to claim 6, wherein said prescribed display instruction causes said display device to display said particular display for a short enough period of time so that said display is impeceptible to a normal viewer.

8. Programming means according to claim 6, wherein said particular display includes the phrase "This apparatus uses the invention of U.S. patent application Ser. No. 324,744".

9. Programming means according to claim 6 wherein said particular display includes the phrase "This apparatus uses the invention of the claims of U.S. patent application Ser. No. 324,744".

10. Programming means for use with apparatus including computer equipment and a display; said programming means including a plurality of instructions, part of which is a prescribed display instruction; said programming means being removably connectable to said computer equipment; said computer equipment when connected to receive said instructions operating to produce signals in accordance therewith; said display device being responsive to said signals and producing displays; said prescribed display instruction causing said computer equipment to produce signals which if received by said display device would cause it to produce a particular display; said computer equipment including means preventing said equipment from operating with programming means not containing said prescribed display instruction; and wherein the improvement comprises a prescribed display instruction which produces a particular display including the phrase "This apparatus practices the invention of U.S. patent application entitled Protected Programmable Apparatus filed on Nov. 25, 1981 and any patent issuing thereon"; said prescribed display instruction causing said display device to display said particular display for a period of time which is short enough so that said display is imperceptible to a normal viewer.

11. Improved apparatus including computer equipment; program material including a plurality of instructions, part of which is a prescribed display instruction; said computer equipment being removably connectable to said program material; said computer equipment when connected to said program material operating to produce signals in accordance with said instructions; a display device responsive to said signals and producing displays in accordance therewith; said prescribed display instruction causing said computer equipment to produce signals which if received by said display device would cause it to produce a particular display; said computer equipment including means preventing said equipment from operating with program material not containing said prescribed display instruction; and wherein the improvement comprises a prescribed display instruction which produces a particular display for so short a period of time that it is imperceptible to a normal viewer.

12. Programming means for use with apparatus including computer equipment and a display device; said programming means including a plurality of instructions; part of which is a prescribed display instruction; said programming means being removably connectable to said computer equipment; said computer equipment when connected to receive said instructions operating to produce signals in accordance therewith; said display device being responsive to said signals and producing displays; said prescribed display instruction causing said computer equipment to produce signals which if received by said display device would cause it to produce a particular display; said computer equipment including means preventing said equipment from operating with programming means not containing said prescribed display instruction; and wherein the improvement comprises a prescribed display instruction producing a particular display; said prescribed display instruction causing said display device to display said particular display for so short a period of time that it is imperceptible to a normal viewer.

13. Programming means according to claim 12, including a read only memory mounted in a cassette like cartridge suitable for plugging into an electrical connector.

* * * * *